United States Patent
Feeser et al.

(10) Patent No.: US 8,875,126 B1
(45) Date of Patent: *Oct. 28, 2014

(54) SYSTEM AND METHOD FOR SERVER CUSTOMIZATION

(71) Applicant: Open Invention Network LLC, Durham, NC (US)

(72) Inventors: Colin Feeser, Atlanta, GA (US); Craig A. Spreha, Decatur, GA (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/135,976

(22) Filed: Dec. 20, 2013

Related U.S. Application Data

(63) Continuation of application No. 13/684,942, filed on Nov. 26, 2012, now Pat. No. 8,621,455, which is a continuation of application No. 12/832,297, filed on Jul. 8, 2010, now Pat. No. 8,327,347, which is a continuation of application No. 11/407,659, filed on Apr. 20, 2006, now Pat. No. 7,802,243.

(51) Int. Cl.
*G06F 9/445* (2006.01)
*H04L 12/24* (2006.01)

(52) U.S. Cl.
CPC ................ *H04L 41/0803* (2013.01)
USPC ........... 717/174; 717/168; 717/170; 717/176; 717/177; 709/201; 709/203

(58) Field of Classification Search
None
See application file for complete search history.

(56) References Cited

U.S. PATENT DOCUMENTS

| | | | |
|---|---|---|---|
| 5,845,078 A * | 12/1998 | Tezuka et al. | 709/222 |
| 6,202,206 B1 * | 3/2001 | Dean et al. | 717/177 |
| 6,574,617 B1 * | 6/2003 | Immerman et al. | 1/1 |
| 6,742,026 B1 * | 5/2004 | Kraenzel et al. | 709/222 |
| 6,845,383 B1 * | 1/2005 | Kraenzel et al. | 1/1 |
| 6,854,112 B2 * | 2/2005 | Crespo et al. | 717/174 |
| 7,228,541 B2 * | 6/2007 | Gupton et al. | 717/175 |
| 7,562,208 B1 * | 7/2009 | Reed et al. | 713/1 |
| 7,694,277 B2 * | 4/2010 | Yuknewicz et al. | 717/121 |
| 2004/0107125 A1 * | 6/2004 | Guheen et al. | 705/7 |
| 2012/0036552 A1 * | 2/2012 | Dare et al. | 726/1 |

* cited by examiner

*Primary Examiner* — Chameli Das
(74) *Attorney, Agent, or Firm* — Haynes and Boone, LLP

(57) ABSTRACT

Customization of a plurality of servers in a computer network. A server customizer module is generated that includes a server customizer initialization file containing a plurality of arguments for populating and running a plurality of standardized applications, scripts and utilities on each server. The server customizer module is installed on each of the plurality of servers for subsequent execution as part of the server build/customization process. A server unattended install launch module, cooperative with the server customizer module is generated that includes an unattended install launch initialization file for launching a plurality of standardized processes on each server. The server unattended install launch module is installed on each of the plurality of servers for subsequent execution as part of the server build/customization process. The server customizer module and server unattended install launch module are executed on each of the plurality of servers to complete customization of each server.

37 Claims, 9 Drawing Sheets

FIG. 3A

CREDENTIALS REQUIRED

USER NAME:
PASSWORD:
DOMAIN:

OK     CANCEL

FIG. 3B

SELECT

Please select a domain name. This name will be used during the process when joining the domain. If the domain name is not listed, you can type the name in the box.

PLEASE SELECT FROM THE FOLLOWING ▼

OK     CANCEL

FIG. 3C

SELECT

Please select a domain name. This name will be used during the process when joining the domain. If the domain name is not listed, you can type the name in the box.

PLEASE SELECT FROM THE FOLLOWING ▼
ENERGYCO.COM
TEST.ENERGYCO.COM
BATUSERS.ENERGYCO.COM
PARTNER.ENERGYCO.COM

FIG. 4

SELECT

Please input the name you would like to assign this computer:

[                    ]

[ OK ]      [ CANCEL ]

FIG. 5A

SELECT

Please input the path which you will assign the ShareName:

[ e:\srvapps ]

[ OK ]      [ CANCEL ]

FIG. 5B

SELECT

Please select the name of the share you wish to create

[ SrvApps ]

[ OK ]      [ CANCEL ]

FIG. 5C

STATUS

SRVAPPS was successfully created on GAXGPP500TS at e:\SRVAPPS

[ OK ]

SELECT

Please input the name of the Share to delete:

SrvApps

[ OK ]   [ CANCEL ]

FIG. 6A

STATUS

SRVAPPS was successfully removed from GAXGPP500TS

ARE YOU SURE?

? THE SYSTEM WILL NOW REBOOT!

[ YES ]   [ NO ]

FIG. 7

SYSTEM AND METHOD FOR SERVER CUSTOMIZATION

CROSS-REFERENCE TO RELATED APPLICATIONS

This application is a continuation of U.S. application Ser. No. 13/684,942 filed on Nov. 26, 2012, entitled SYSTEM AND METHOD FOR SERVER CUSTOMIZATION, now issued U.S. Pat. No. 8,621,455 issued on Dec. 31, 2013, which is a continuation of U.S. application Ser. No. 12/832,297 filed on Jul. 8, 2010, entitled SYSTEM AND METHOD FOR SERVER CUSTOMIZATION, now issued U.S. Pat. No. 8,327,347 issued on Dec. 4, 2012, which is a continuation of U.S. application Ser. No. 11/407,659 filed Apr. 20, 2006, entitled SYSTEM AND METHOD FOR SERVER CUSTOMIZATION, now issued U.S. Pat. No. 7,802,243 issued on Sep. 21, 2010, each of which is incorporated herein in its entirety.

A portion of this disclosure contains material that is subject to copyright protection. The copyright owner consents to the reproduction of the disclosure, as it appears in the Patent and Trademark Office patent files or records, but otherwise reserves all copyright rights whatsoever.

BACKGROUND OF THE INVENTION

The present invention relates generally to management of servers in a large wide area network and, more particularly, to processes for building servers consistently.

A large enterprise with hundreds or thousands of servers may easily build or rebuild 30 or more servers each month with a goal of having each server being built being as similar as possible to the other servers. Having this consistency in the server build process makes the support of the servers, once they are in production environment, much easier to manage. To this end, exhaustive effort is applied to developing processes and procedures to be followed while building a server. However, even with such processes and procedures, due to the number of persons involved in building servers and the odd times at which a server might need to be rebuilt, mistakes are often made which can cause problems once the server is in a production environment.

Prior art solutions for server customization use an assortment of batch files, Visual Basic scripts, and compiled executables. Each of these components can handle part of the installation process, but not the entire process.

Other prior art solutions require detailed manual step-by-step written procedures to make sure the technical components are executed correctly. More training is required for a manual approach because the installer has to understand the procedures and also know which technical tools to use to follow the steps of the procedures. This means that there is more room for error and inconsistency because the installer may miss a step or complete a step incorrectly.

SUMMARY OF THE INVENTION

The invention is directed to a software utility and method to provide consistency in the server build process making the support of the servers in a large enterprise computer network much easier to manage once the servers are in production. The invention provides a software scripting and maintenance solution that includes two pieces of software: server customizer (SrvCust) and the mostly unattended install launch utility (SrvMUI). In an exemplary, non-limiting embodiment, both applications are written in C# and require the Microsoft .NET framework.

The server customizer is a Graphical User Interface (GUI)-based and initialization (.ini) file driven software utility. A pre-determined set of configuration conditions can be set up using the server customizer and then used repeatedly, resulting in highly consistent file server configurations. The server customizer user interface, in an exemplary, non-limiting embodiment, includes four tabs: "Build", "Customize", "Install" and "Utilities". Each tab is populated as a radio button menu via input in the initialization file. The functionality of each radio button is driven by the manner in which the information is input into the initialization file. Some of the functionality built into server customizer focuses on launching different scripts and utilities. The server customizer can also be configured to reboot the machine upon completion of the script, or to enter the domain by inserting into a particular Organizational Unit (OU) in the Active Directory, setting the computer name and create or delete shares. The true functionality comes in the integration of the server customizer with the SrvMUILaunch utility.

SrvMUI is another initialization file driven utility. Though it does have a GUI interface, that interface mostly serves as a status monitoring form mirroring the input to the log file while the operation is taking place. Included among SrvMUI's functionality are registry configuration; keyword substitution; file execution; MSI installations, updating local files with centrally maintained files; rebooting the machine with or without a prompt; service stop, start and restarts; creating and deleting shares, writing to a text based file (for scripting purposes), conditional skipping of certain steps based upon keywords; conditional ending of the process if the machine is or is not a domain controller; and adding or removing a local identifier (ID) or group from the machine. It can also prompt for continued execution, maintain and prompt based upon versioning of the initialization file and set the version of the initialization file. All of this functionality can be chained in an theoretically unlimited fashion in the initialization file. SrvMUI has the ability to run in a standalone manner or to be launched from the server customizer.

In one aspect of the invention, a method is provided for customization of a plurality of servers in a computer network. A server customizer module is generated that includes a server customizer initialization file containing a plurality of arguments for populating and running a plurality of standardized applications, scripts and utilities on each server. The server customizer module is installed on each of the plurality of servers for subsequent execution as part of the server build/customization process. A server unattended install launch module is generated that includes an unattended install launch initialization file for launching a plurality of standardized processes on each server. The server unattended install launch module is installed on each of the plurality of servers for subsequent execution as part of the server build/customization process. The server customizer module and server unattended install launch module are executed on each of the plurality of servers to complete customization of each server.

In another aspect of the invention, a computer program product is provided for customization of a plurality of servers in a computer network. The computer program product comprises a computer readable medium having embedded computer readable code. The computer readable medium comprises program instructions that generate a server customizer module including a server customizer initialization file containing a plurality of arguments for populating and running a plurality of standardized applications, scripts and utilities on each server; program instructions that install the server customizer module on each of the plurality of servers; program instructions that generate a server unattended install launch module including an unattended install launch initialization file for launching a plurality of standardized processes on each server; program instructions that install the server unattended install launch module on each of the plurality of servers; and program instructions that execute the server customizer module and server unattended install launch module on each of the plurality of servers to complete customization of each server.

In yet another aspect of the invention, a system is provided for customization of a plurality of servers in a computer network. The system includes a server unattended install launch module including an unattended install launch initialization file for launching a plurality of standardized processes on each server. The system also includes a server customizer module, cooperative with the server unattended install launch module, and including a server customizer initialization file containing a plurality of arguments for populating and running a plurality of standardized applications, scripts and utilities on each server. A server customizer module user interface enables user interaction with the server customizer module and includes a plurality of tabs that are generated by the server customizer initialization file wherein each tab includes a plurality of selectable functions. Each selectable function includes a set of keys that provide a value for a name, a location, a plurality of arguments, and a log file associated with the selectable function.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIGS. 3A-3E illustrate exemplary user interface prompts for the "join domain" function of the server customizer.

FIG. 4 illustrates an exemplary user interface prompt for the "set computer name" function of the server customizer.

FIGS. 5A-5C illustrate exemplary user interface prompts for the "create share" function of the server customizer.

FIGS. 6A-6B illustrate exemplary user interface prompts for the "delete share" function of the server customizer.

FIG. 7 illustrates an exemplary user interface prompt for the "reboot machine" function of the server customizer.

DETAILED DESCRIPTION OF THE INVENTION

Figure 1A:
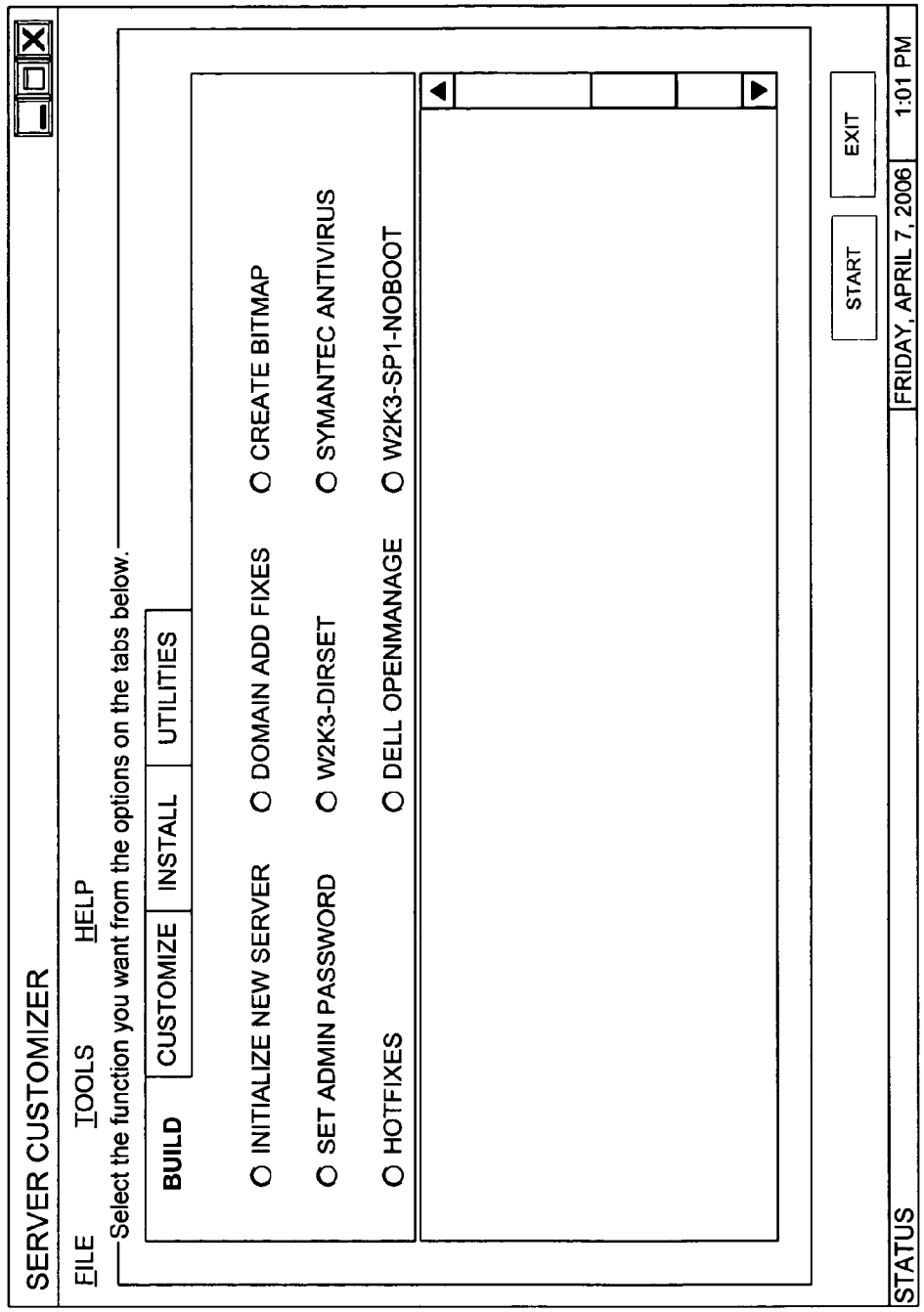
FIGS. 1A-1D illustrate user interfaces for the several sections of the server customizer utility in accordance with an exemplary embodiment of the invention.
Figure 1B:
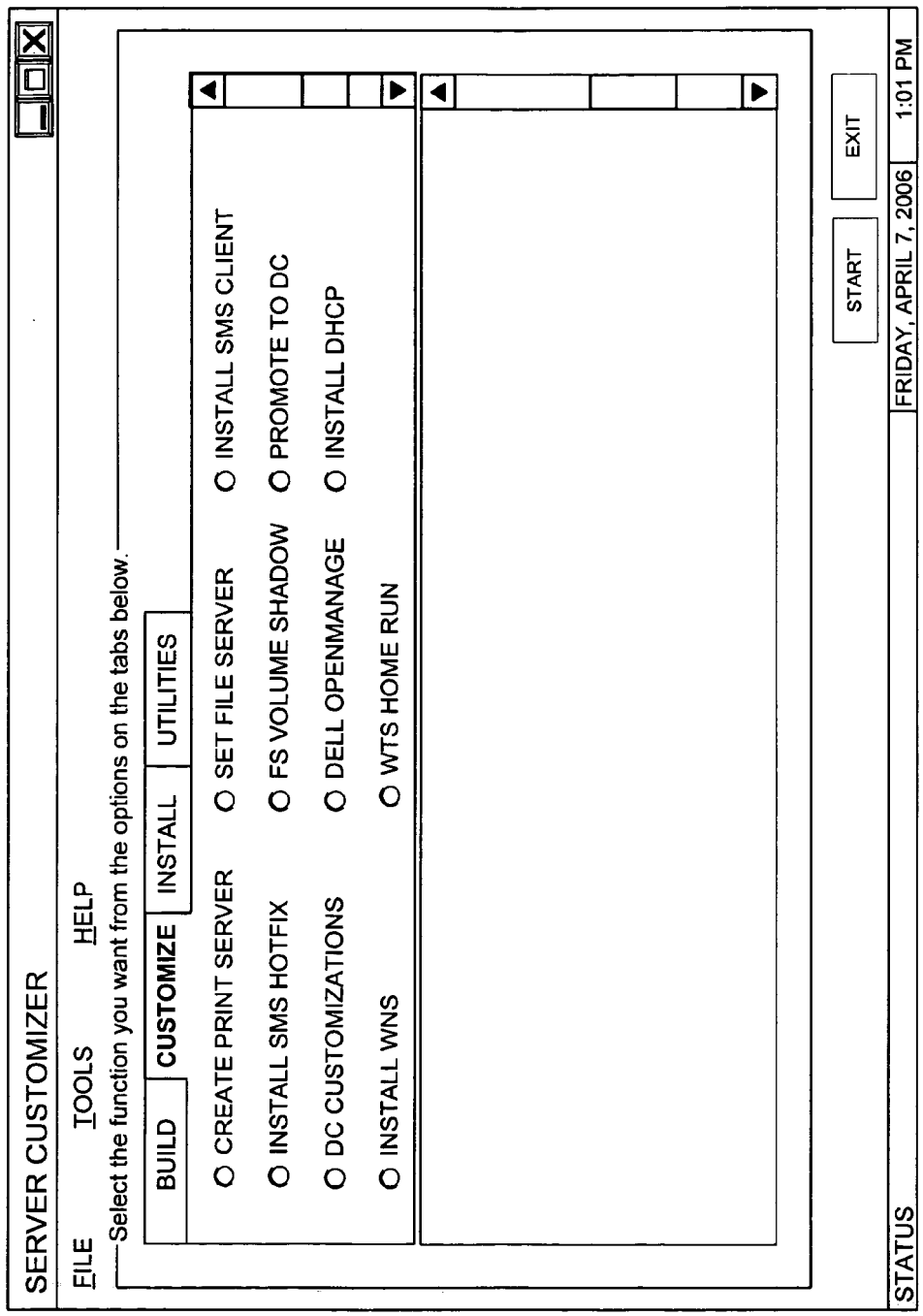
Figure 1C:
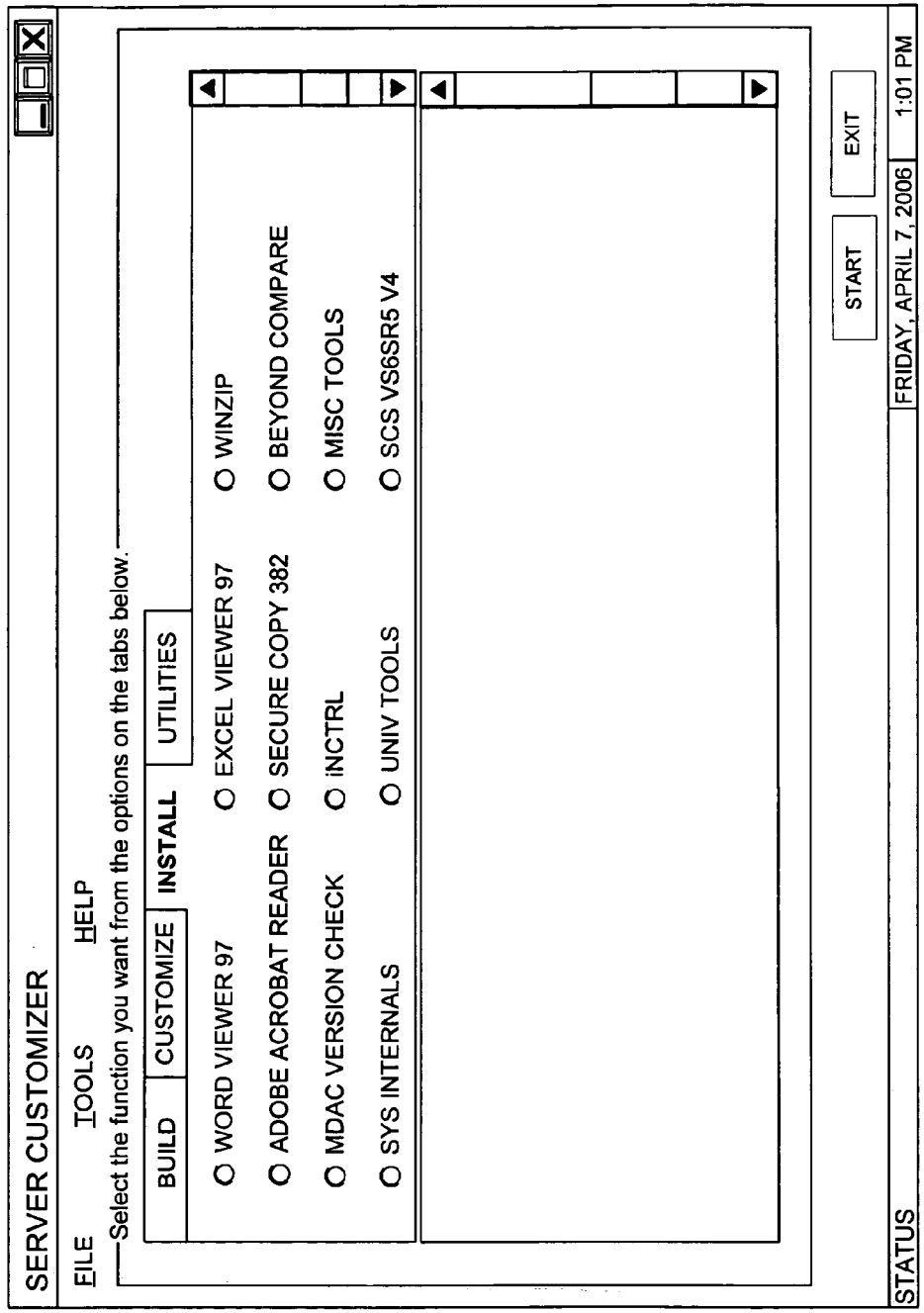
Figure 1D:
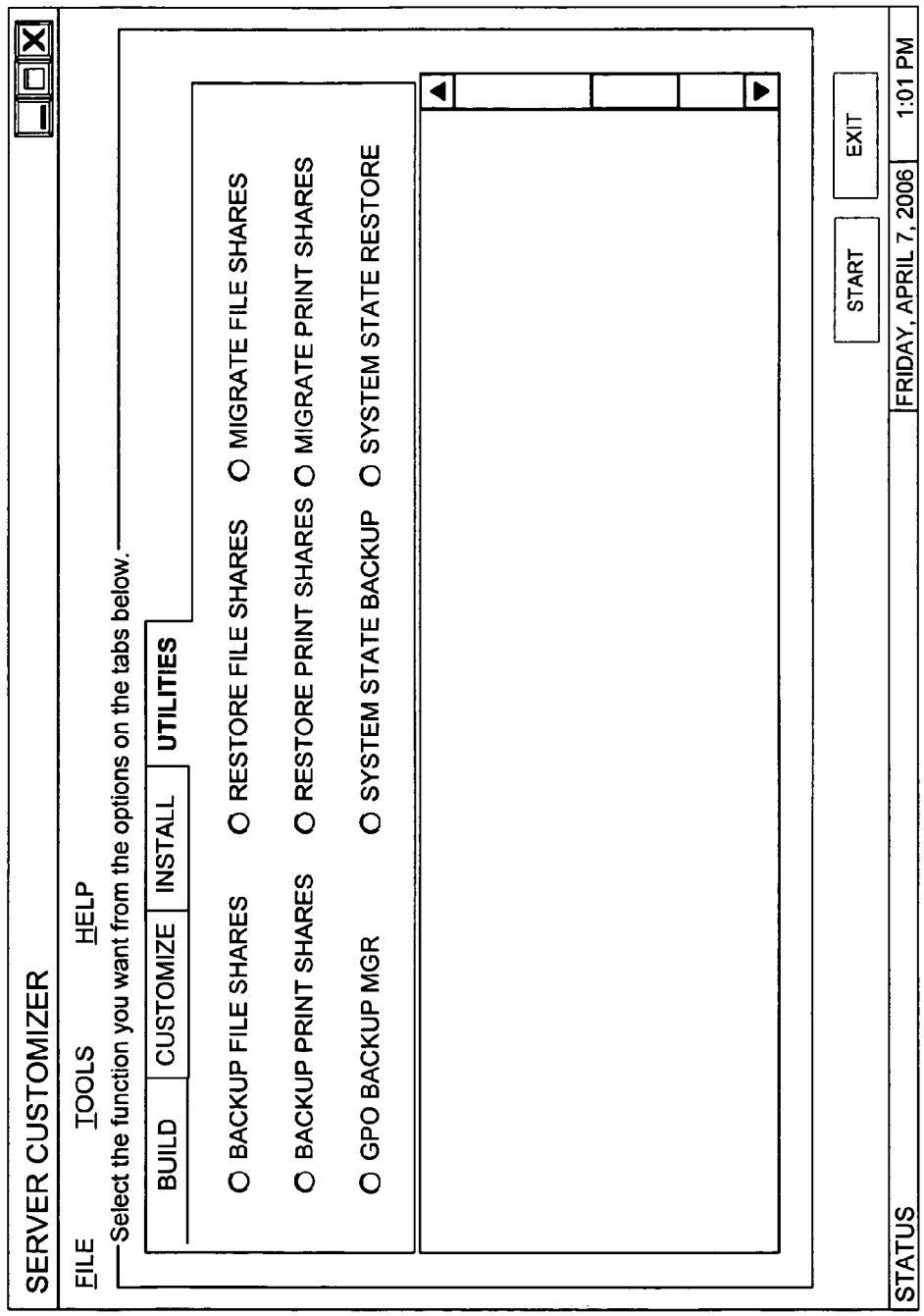

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The exemplary embodiment of the invention is described in terms of the Microsoft .NET framework and the C# high level language. The .NET framework has two main elements: a virtual machine called the Common Language Runtime (CLR) and the Base Class Libraries (BCL). When a program is developed for .NET in a high level language such as C# or VB.NET, the compiler generates Intermediate Language (IL) which is similar to assembly language code. The CLR then takes the code in IL form and converts it to machine code that it executes. The code that is generated is called managed code. The CLR controls all aspects of allocating memory and lifetime of objects. The BCL is a set of classes and functions that enable the programmer to communicate with the operating system and other technologies.

C# is a language derived from C++ by Microsoft for the .NET Framework. C# doesn't use pointers, has single inheritance, does not have macro support, and does not have template support. Single inheritance means that a class can only derive from at most one other class. When a class inherits from another class, it gains all the properties, methods, fields, events, and constructors from the class from which it inherited (i.e., the base class). The class that inherits from the base class is referred to as the derived class.

Most of the BCL classes are written in C#. The other principal language for the .NET Framework is Visual Basic-.NET (VB.NET) that has been modified significantly from Visual Basic to account for the object-oriented features of the BCL. Both C# and VB compile to IL, thus their performance is about the same.

It is important for applications to identify users and control access to resources. Authentication is the act of determining the identity of the requesting user. Typically, the user must present credentials such as a name/password pair in order to be authenticated. Once the authenticated identity is established, the right to access a given resource must be determined.

In an exemplary, non-limiting embodiment, installing the server customizer (SrvCust) utility requires copying three files to a folder on the local computer. These files are SrvCust.exe, SrvCust.ini and ErrorCodes.ini. The folder which is designated for the server customizer will be established in the SrvCust.ini file at the bottom of the file:
[DomainList]
numDomain=4
Domain1=ENERGYCO.COM
Domain2=TEST.ENERGYCO.COM
Domain3=BATUSERS.ENERGYCO.COM
Domain4=PARTNER.ENERGYCO.COM
[AppSettings]
NetPath="\\ServerBuild\dfsroot\ServerBuild\Windows\Automation"
LocalPath="C:\SrvCust"
CustPath="\\ServerBuild\dfsroot\ServerBuild\Windows\Automation\Customizer"
MUIEXEFileName="SrvMUI.exe"

In the preceding example, the "LocalPath" is the location where the server customizer utility will be located on all machines using the server customizer. Also included in this configuration is the list of domains that will managed as part of the server configuration, the "NetPath" and "CustPath" which is the central location of the server customizer "gold" files (i.e., the server customizer will automatically update itself and all initialization files from this location). Finally, the MUIEXEFileName designates the executable launched when a launch file is designated with an .ini extension in the server customizer main initialization file. Without input from the initialization file, the server customizer is just a blank shell. Adding the pertinent detail into the initialization file makes the server customizer a useful tool.

The server customizer initialization (SrvCust.ini) file is the heart of the entire server customizer system. This file contains the arguments for populating and running applications, scripts and setup functions for the purpose of customizing servers. Each section of the initialization file, i.e., "Build", "Customize", "Install", and "Utilities", corresponds to one of the tabs in the server customizer user interface, as illustrated in FIGS. 1A-1D. Each of the four sections has a set of keys that assigns a value corresponding to a button in the tab being referenced. The first value will always be the number of buttons in the tab. Following that is a set of arguments which supply the name, location, arguments, log file information and potential update path for each of the buttons beginning with the name of the tab and ending with the number of the button.

For example, the following few lines are the beginning of the initialization file which populates the "Build" tab in the first form of the above examples:

[Build]
NumBuild=9
Name1="Initialize New Server"
File1="Initialize.ini"
Path1="c:\srvcust\Build\"
UpdatePath1="\\serverbuild\dfsroot\ServerBuild\
    Windows\Automation\Customizer\BuildInitializ
e.ini"
LogPath1="c:\SrvCust\Logs\"
LogFile1="Initialize.log"
UponCompletion1="Join"
Name2="Domain Add Fixes"
File2="DomainAddFix.ini"
Path2="c:\srvcust\tools\"
UpdatePath2="\\serverbuild\dfsroot\ServerBuild\
    Windows\Automation\Customizer\Build\Domain
AddFix.ini"
LogPath2="c:\SrvCust\Logs\"
LogFile2="DomainAddFixes.log"
Name3="Create BitMap"
File3="WallPaper.exe"
Arg3="changename"
Path3="c:\srvcust\tools\WallPaper\"
UpdatePath3="\\serverbuild\dfsroot\ServerBuild\
    Windows\Automation\Scripts\WallPaper\WallPa
per.exe"
LogPath3="c:\SrvCust\Logs\"
LogFile3="BitMap.log"

As further illustrated in FIG. 1A, the above segment sets the first three radio buttons on the "Build" tab of the server customizer user interface. This is established by the fact that the "Build" section in the initialization file corresponds to the "Build" tab. After that the next required entry is the "NumBuild" key designating how many radio buttons will be built on the tab. In this example, and as further shown in the figure, there will be nine radio buttons on the "Build" tab.

Each button has a set of numerically identified keys that assigns the functionality of the button. The first set of keys has all but one of the possible combinations, Name, File, Path, Arg, UpdatePath, LogPath, LogFile and UponCompletion. Assigning a number to the end of a key assigns the location on the tab. In this example, the first button is assigned its title with:

Name1="Initialize New Server"
This means that the title of the first button will be "Initialize New Server". The file which is launched is assigned using the "File" key and the number 1:
File 1="Initialize.ini"

In many cases this can be an executable file, a batch or command file, or an installation (.msi) file which would be used to run an installation. In this case it is an initialization file which causes the server customizer to launch SrvMUI. This will be discuss further below.

The "Path" key denotes the location from which the file will be launched. The location includes the full path including the drive and ends in a backslash (\). For the above example:
Path1="c:\srvcust\Build\"

The "Arg" key is the only key not used in the first button. It is literally the argument which would be passed to a launched file when it is launched.

The "UpdatePath" key is the location on the network where a "gold" copy of the file being launched is maintained. The server customizer checks the date and time stamp and version of the local file against that of the central file and if different, the local file is updated with the one stored on the network.

The "LogPath" key is the folder where the log for the current activity will be written.

The "LogFile" key is the name of the file to which the log will be written in the above location.

Finally, the "UponCompletion" key instructs the server customizer what it should do after the file it has launched has finished its process. In the above example:
UponCompletion1="Join"

The "UponCompletion" key means that when the process "Initialize New Server" finishes it will prompt to join a domain by offering the user a selection of domains and OUs for server placement.

Microsoft Windows Installer (MSI) based installations are assumed to be launched from a centralized network path. Other executable files can be launched from a network or local path. If launched from a local path, the user can specify a network path to check for an updated file. The check for updated file will take place before the file is launched. If an update is found, then the updated file will be copied to the launch location. Table 1 below summarizes the key functions associated with the build function of the server customizer utility. Table 2 immediately follows Table 1 and includes the launch file extensions in an exemplary embodiment. The launch file extensions include .exe for an executable file, .msi for an installation file from a central location, .cmd for a command file, .bat for a batch file and .ini for an initialization file.

TABLE 1

Key Functions for Tab Buttons

| | | |
|---|---|---|
| NumTabName | Required | Equals the number of button selections to display in the tab. |
| Name # | Required | The title to be displayed with the button. |
| File # | Required | The freestanding file name which is to be launched. This can be an .exe, .cmd, .bat, .msi, or .ini type file name. |
| Path # | Required | Full path to the location of the file. File should not be included. Path should end in a "\". |
| Arg # | Optional | This is the argument string, if any that is to be passed to the executable file. MSI arguments should not include /q. |
| LogPath # | Required | Full path to location that the log recording the process should be written. Does not include the file name. Must end in a "\". |

TABLE 1-continued

Key Functions for Tab Buttons

| | | |
|---|---|---|
| LogFile # | Required | Freestanding file name for the log file to be created to record the process. |
| UpdatePath # | Optional | Does not apply to MSI installations. If a file is to be launched from a local location, this can point to a centralized network path which holds the latest or golden copy of the file to be launched. Entering a full path, with file name, in this key will cause the server customizer to check for a later version and update the local file before launching. |
| UponCompletion # | Optional | Choice of "PromptReboot", "Reboot", "Rename", "Join" or "Delete". Default is none. PromptReboot: Upon completion asks to reboot the server. Reboot: Upon completion reboots the server. Rename: Upon completion prompts to rename the server. Then reboots. Join: Upon completion prompts to join the domain. Then reboots. Delete: Upon completion will delete the file specified in File #. |

TABLE 2

Launch File Extensions

| | |
|---|---|
| .exe | Launches an executable file. Also can check for update if LaunchUpdatePath is specified. Arguments can be specified using LaunchArg. |
| .msi | Launches an msi installation file from a central location. The server customizer will expect the name of the folder, under which the .msi fileis to be launched, to identically match the button name. Given the example of:<br>[Install]<br>NumInstall = 14<br>Name1 = "Word Viewer 97"<br>File1 = "Word Viewer 97.msi"<br>Path1 = "\\energyco\dfsroot\Software\InstallPackages\"<br>LogPath1 = "c:\SrvCust\Logs\"<br>LogFile1 = "WordViewer97.log"<br>The server customizer will look at the "Name1" key, "Word Viewer 97" and appendthat to the end of "Path1" or \\energyco\dfsroot\Software\InstallPackages\. It will then append the "File1" key making the entire launch string read: "\\energyco\dfsroot\Software\InstallPackages\Word Viewer 97\Word Viewer97.msi" |
| .cmd | Launches a command file. Also can check for update if UpdatePath is specified. Arguments can be specified using the "Arg" key. |
| .bat | Launches a batch file. Also can check for update if UpdatePath is specified. Arguments can be specified using the "Arg" key. |
| .ini | Launches SrvMUI to run the .ini file specified in the "File" key. Will update the local .ini with the central "gold" copy if it is different. |

Figure 2:
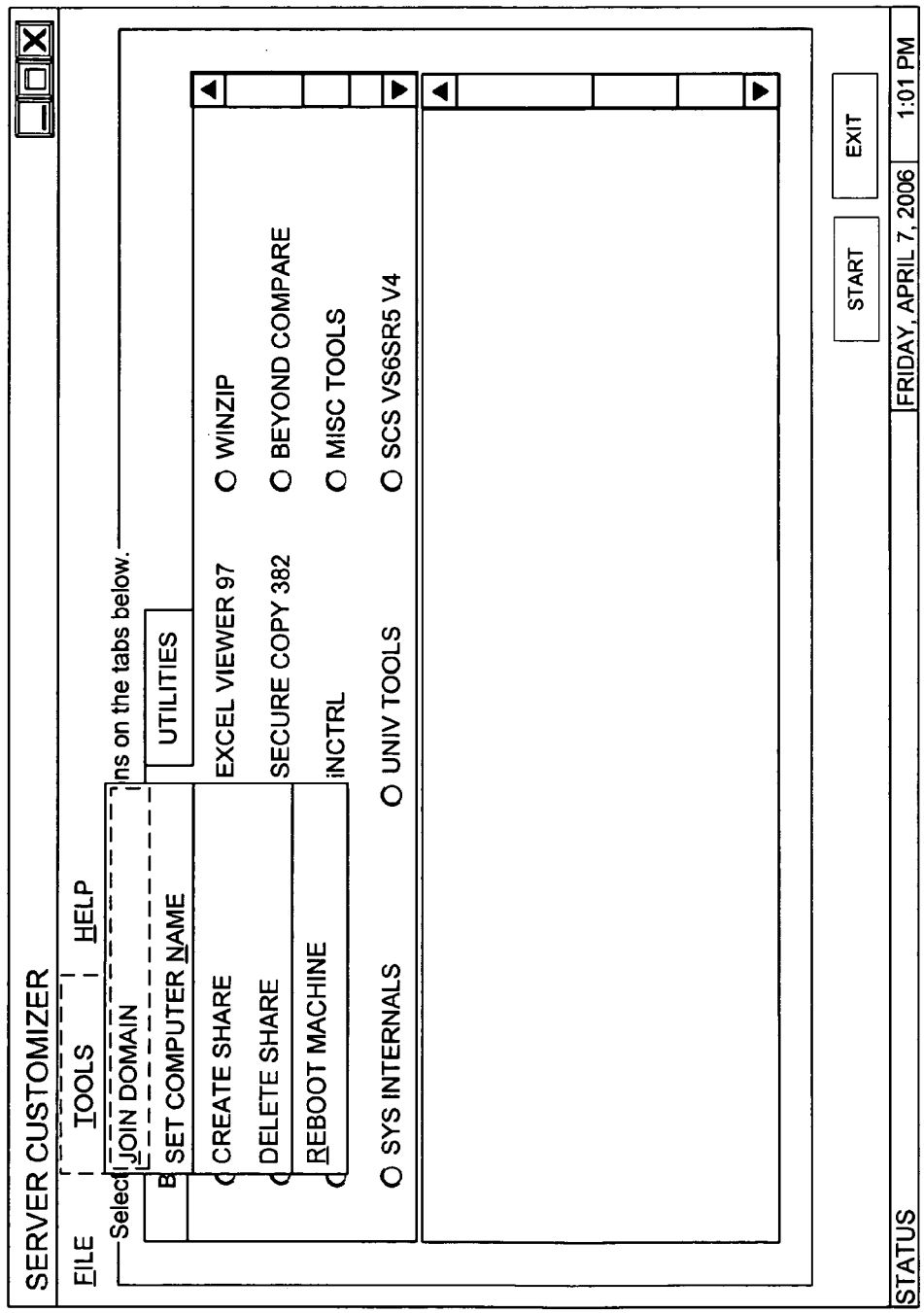
FIG. 2 illustrates a user interface identifying additional server customizer functions available to the user in an exemplary embodiment of the invention.

Other server customizer functions are available under the "Tools" menu as illustrated in FIG. 2. These functions include "Join Domain", "Set Computer Name", "Create Share", "Delete Share", and "Reboot Machine".

Figure 3D:
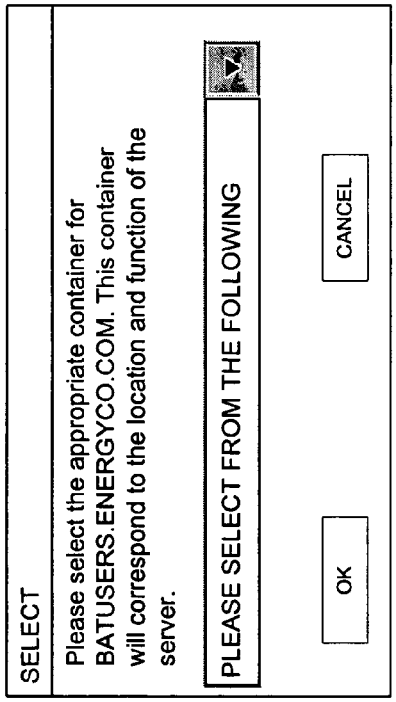
Figure 3E:
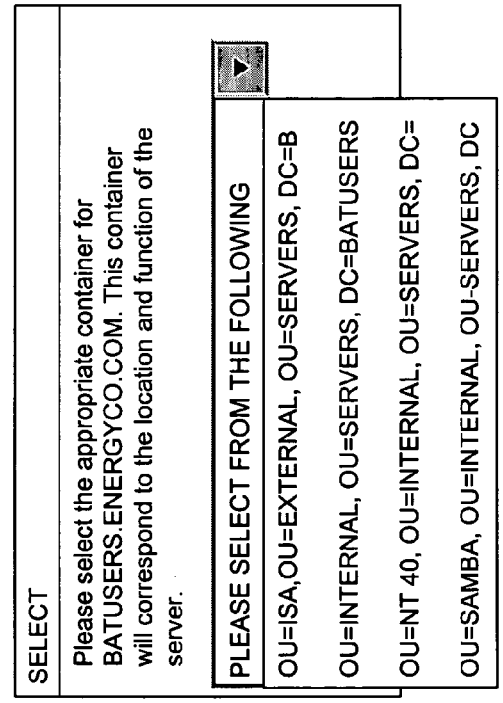

The "Join Domain" function generates a series of prompts beginning with the user's name and password credentials as shown in FIG. 3A. The user is then prompted to select a domain name into which the server should be inserted as shown in FIGS. 3B-3C. The user is next prompted to select the OU or container in Active Directory to which the server should be added as shown in FIGS. 3D-3E.

The "Set Computer Name" function prompts the user to change the computer name as illustrated in FIG. 4.

The "Create Share" function prompts the user for the path to the share to create as illustrated in FIG. 5A. The user is then prompted for the name of the share as illustrated in FIG. 5B. If successful, a message similar to that displayed in FIG. 5C will appear.

The "Delete Share" function prompts the user for the name of a share to be deleted as illustrated in FIG. 6A. If successful, a message similar to that displayed in FIG. 6B will appear.

The "Reboot Machine" function will prompt the user for a machine reboot as illustrated in FIG. 7. Selecting "Yes" will cause the machine to reboot immediately.

In an exemplary, non-limiting embodiment, the installation of the SrvMUI utility requires four files: ErrorCodes.ini, ShortCut.dll and SrvMUI.exe. If the SrvMUI utility is going to be run in standalone mode, it will also require an initialization file matching its name, SrvMUI.ini. Simply launching the SrvMUI will cause it to look for SrvMUI.ini in the same folder where SrvMUI.exe exists. This is the standalone usage of the SrvMUI in the initial stages of building a server during the imaging process. Otherwise passing a slash delimited argument of the User ID, password and initialization file can also be used as a standalone method for launching the SrvMUI without using a SrvMUI file. An example of calling the SrvMUI in this manner would be as follows:

c:\srvcust\SrvMUI userID/password/test.ini

For the most part, the SrvMUI is designed to be run either in the standalone manner above, from the server customizer, or re-launched from the SrvMUI itself The graphical user interface part of the SrvMUI is mostly a logging shell. In many uses, this shell will not be visible while the tool that it is launching is in use. Otherwise, while events are taking place, the log of events will pass through the reporting window and the status bar.

The purpose of the SrvMUI utility is to chain events as part of a procedure, an install process or keeping local files up-to-date with a centralized "gold" copy.

As with the server customizer, the SrvMUI requires a consistent setup regarding the initialization files which are used. Since the SrvMUI is completely driven by initialization files, the format of the initialization file is of utmost importance. Also, as with the server customizer, there is a section at the bottom of each SrvMUI.ini file which needs to be properly filled out for the SrvMUI to function correctly. Incorrectly filling out this portion of the initialization file will cause unpredictable results with the SrvMUI.

[AppSettings]
NetPath="\\ServerBuild\dfsroot\ServerBuild\Windows\Automation"
LocalPath="C:\SrvCust"
CustPath="\\ServerBuild\dfsroot\ServerBuild\Windows\Automation\Customizer"
FormText="Unattended Install"
Complex="c3#"

In the preceding example, the "LocalPath" is the location where the SrvMUI.exe will be located on all machines using the SrvMUI. Also included in this configuration is the "NetPath" and "CustPath" which is the central location of the server customizer "gold" files (i.e., the SrvMUI will automatically update itself and all initialization files from this location). Finally, the "FormText" key identifies the name which shows up in the banner bar of the form during execution. "Complex" is a key for creating a complex randomly generated and encrypted word and can be used for password creation using the "@Complex@" substitution keyword.

The initialization files used for SrvMUI are the very core of the operation of the SrvMUI. There is an incredible amount of flexibility and capability built into using the initialization files. The initialization files for the SrvMUI operate somewhat differently than the initialization files for the server customizer. The server customizer includes four functional sections and an "AppSettings" section. The SrvMUI can have a theoretically unlimited number of sections plus the "AppSettings" section. Each functional section is a separate process. The process functionality is determined by the extension of the "LaunchFile" key. The following is an example of some settings from an initialization file for the SrvMUI:

[Windows Disable Desktop Cleanup Wizard]
LaunchName="Registry Value Add (Disable Desktop Cleanup Wizard)"
LaunchFile="Registry.Rga"
LaunchPath="HKCU\Software\Microsoft\Windows\CurrentVersion\Explorer\Desktop\Cleanup Wiz\NoRun=1d"
LaunchLogPath="c:\SrvCust\Logs\"
LaunchLogFile="Registry.log"
[Install Explorer Lnk]
LaunchName="Desktop Explorer Lnk"
LaunchFile="Update.upd"
LaunchUpdatePath="\\serverbuild\dfsroot\ServerBuild\Windows\Automation\Scripts\Shortcuts\Explorer.lnk"
LaunchPath="C:\Documents and Settings\All Users\Desktop\Explorer.lnk"
LaunchLogPath="C:\SrvCust\Logs\"
LaunchLogFile="SrvCust.log"
[Install CMD Lnk]
LaunchName="Desktop CMD Lnk"
LaunchFile="Update.upd"
LaunchUpdatePath="\\serverbuild\dfsroot\ServerBuild\Windows\Automation\Scripts\Shortcuts\Command Prompt.lnk"
LaunchPath="C:\Documents and Settings\All Users\Desktop\Command Prompt.lnk"
LaunchLogPath="C:\SrvCust\Logs\"
LaunchLogFile="SrvCust.log"
[Install MBSA 1.2]
LaunchName="MBSA-v1.2"
LaunchFile="MBSASetup-en.msi"
LaunchPath="\\serverbuild\dfsroot\ServerBuild\Windows\InstallFiles\Software\BaselineAnalyzer\"
LaunchLogPath="c:\SrvCust\Logs\"
LaunchLogFile="MBSA-12.log"
* HotFixes *
[Launch HotFixes]
LaunchName="Install W2K3 HotFixes"
LaunchFile="HotFixes.ini"
LaunchPath="C:\srvcust\Build\"
LaunchUpdatePath=\\serverbuild.energyco.com\dfsroot\ServerBuild\Windows\Automation\Customizer\Build\HotFixes.ini
LaunchLogPath="C:\SrvCust\Logs\"
LaunchLogFile="MUIHotFixes.log"
[Scramble Guest Password]
LaunchName="Scrambling Guest Password"
LaunchFile="ScrambleGuest.exe"
LaunchPath="C:\SrvCust\Tools\"
LaunchUpdatePath="\\ServerBuild\dfsroot\ServerBuild\Windows\Automation\Scripts\ScrambleGuest.exe"
LaunchLogPath="c:\SrvCust\Logs\"
LaunchLogFile="ScrambleGuest.log"
[Reboot When Done]
LaunchName="Reboot upon Completion."
*.rbp—reboot with prompt. *.rbt—reboot without prompt
LaunchFile="Reboot.rbt"
LaunchLogPath="c:\SrvCust\Logs\"
LaunchLogFile="Reboot.log"

In the above example, several of the capabilities of the SrvMUI are demonstrated.

In the first section, "Windows Disable Desktop Cleanup Wizard", the "LaunchFile" extension is ".rga" which designates that a registry add will be processed. The registry addition is contained in the "LaunchPath" key as:
"HKCU\Software\Microsoft\Windows\CurrentVersion\Explorer\Desktop\CleanupWiz\NoRun=1d"

The second section, "Install Explorer Lnk", shows how to update a file using the ".upd" extension. "Install MBSA 1.2" shows how to run an MSI setup using the ".msi" extension. "Launch HotFixes" shows how to run an iterative MUI using the ".ini" extension. Finally, "Reboot When Done" shows how to perform a no prompt reboot using the ".rbt" extension. This is just a small part of the functionality. The full list of capabilities are provided in the tables included below.

The most important thing to remember when structuring the SrvMUI.ini files is that each function in the file is setup as a section contained in square brackets [ ]. This section name can be anything, but it must be unique to the rest of the sections in the file. Furthermore, the section name cannot contain any of the "Special Section Names," otherwise the functionality of the special name will be provided instead of what was intended by the following keys. A list of "Special Section Names" is provided in Table 3 below. There can be, theoretically, any number of sections in the initialization file. The "AppSettings" section must be at the end of every initialization file and must contain accurate information for the file to be processed correctly. Tables 4-5 immediately follow Table 3. Table 4 provides a list of initialization key settings. Table 5 provides a list of launch file extensions.

TABLE 3

Special Section Names

| | |
|---|---|
| [Prompt] | With "LaunchArg" value as the message offers a yes or no MessageBox which will stop progress if no is selected.<br>Example:<br>[Prompt]<br>LaunchArg = "Are you sure you want to install DNS on this server?" |
| [Version] | With "Version" value of a specified version will prompt with yes or no to continue if same version is not set in the registry.<br>Example:<br>[Version]<br>Version = 1.0 |
| [SetVersion] | With "Version" value of a specified version will set the version of .ini in registry after passing this prompt.<br>Example:<br>[SetVersion]<br>Version = 1.0 |
| [Select] | Followed by keys named select followed by a number will popup a menu selection based upon the number of select keys and their values. The actual selection can be used later in the .ini file using the @Select@substitution keyword.<br>Example:<br>[Select]<br>Select1 = Clusters<br>Select2 = Database Server<br>Select3 = File & Print<br>Select4 = Print Servers<br>Select5 = App Server<br>Select6 = SMS Servers<br>[Update GRC.dat]<br>LaunchName = "Dropping GRC.dat"<br>LaunchFile = "Update.upd"<br>LaunchUpdatePath =<br>"\\gaxgpap61\ c$\ProgramFiles\SAV\Groups\@Select@\GRC.DAT"<br>LaunchPath = "C:\Documents and Settings\All Users\ApplicationData\Symantec\ \ 7.5\grc.dat" |

TABLE 3-continued

Special Section Names

```
LaunchLogPath        = "C:\SrvCust\Logs\"
LaunchLogFile        = "SAV.log"
[DeleteSystemStateFile]
LaunchName           = Removing SystemState File
LaunchFile           = Delete.del
LaunchArg            = @get@_SystemState.bkf
LaunchPath
e:\SrvCust\Tools\systemstate\restore\@LaunchArg@
LaunchLogPath        = "c:\SrvCust\Logs\"
LaunchLogFile        = "SystemStateRestore.log"
```

TABLE 4

Initialization Key Settings

| | | |
|---|---|---|
| Launch-Name | (required) | The name to be displayed in the log file. |
| LaunchFile | (required) | The freestanding file name which is to be launched. |
| LaunchPath | (required) | Full path to the location of the file. File should not beincluded. Path should end in a "\" (if referring to a file path). LaunchPath can also refer to a registry path or a service name corresponding to the LaunchFile extension. |
| Launch-LogPath | (required) | Full path to location where the log recording the process should be written. Does not include the file name. Must end in a "\". |
| Launch-LogFile | (required) | Freestanding file name for the logfile to be created to record the process. |
| LaunchArg | (optional) | MSI installs should not use the /q. This is the argument string, if any that is to be passed to the executable file. Substitute '@Complex@' for set of complex characters based upon the value assigned to the key "Complex" in the "AppSettings" section.<br>Example of usage:<br>[Write to dcpromo.txt line #8]<br>LaunchName = "Writing to dcpromo.txt"<br>LaunchFile = "Write.wri"<br>LaunchPath = "C:\SrvCust\dcpromo.txt"<br>LaunchArg = "SafeModeAdminPassword=@ComputerName@@Complex@"LaunchLogPath = "c:\SrvCust\Logs\"<br>LaunchLogFile = "DCPromo.log"<br>Substitute '@Get(Arg Name)' to prompt for an argument. 'Arg Name' can be substituted for the display name of the argument being prompted for. This can later be used in the same .ini file as a substitution using the keyword @get@.<br>Example of usage:<br>[Get Remote File Name]<br>LaunchName = "Getting Remote FileName"<br>LaunchFile = "nothing"<br>LaunchArg = @get(Server SystemState is copied from)<br>LaunchPath = "nothing"<br>LaunchLogPath = "c:\SrvCust\Logs\"<br>LaunchLogFile = "SystemStateRestore.log"<br>[Validate Copy System-State Zip File]<br>LaunchName = "Validating Zip Copy"<br>LaunchFile = Validate.skp<br>LaunchArg = "Prompt=Copy SystemState Zip File from @get@?"<br>LaunchLogFile = "DomainAddFixes.log"<br>[CopySystemStateFileLocal]<br>LaunchName = "Copying System State File Local"<br>LaunchFile = "xcopy.exe"<br>LaunchArg = "\\@get@\c$\srvcust\tools\systemstate\ |

TABLE 4-continued

Initialization Key Settings

| | | |
|---|---|---|
| | | backup\@get@_SystemState.zip e:\srvcust\tools\systemstate\restore\ /i /F /R /Y/Z"<br>LaunchPath = "@WinDir@\System32\"<br>LaunchLogPath = "c:\SrvCust\Logs\"<br>LaunchLogFile = "SystemStateRestore.log" |
| Launch-UpdatePath | (optional for exe) | Does not apply to MSI Installations. If a file is to be launched from a local location, this can point to a centralized network path which holds the latest or golden copy of the file to be launched. Entering a full path, with file name, in this key will cause the SrvMUI to check for a later version and update the local file before launching. |

TABLE 5

Launch File Extensions

| | |
|---|---|
| .exe | Launches an executable file. Also can check for update if LaunchUpdatePath if specified.<br>Example:<br>[Run DNSCmd.exe EnableEDnsProbes]<br>LaunchName = "Setting EnableEDnsProbes"<br>LaunchFile = "DnsCmd.exe"<br>LaunchPath = "C:\SysUtil\SupportTools\"<br>LaunchArg = "/config /EnableEDnsProbes 0"<br>LaunchLogPath = "c:\SrvCust\Logs\"<br>LaunchLogFile = "InstallDNS.log" |
| .cmd | Launches a .cmd file. Also can check for update if LaunchUpdatePath if specified. Arguments can be specified using LaunchArg.<br>Example:<br>[Run DomainAddFixes.cmd]<br>LaunchName = "Domain Add Fixes"<br>LaunchFile = "DomainAddFixes.cmd"<br>LaunchPath = "C:\SrvCust\Tools\"<br>LaunchUpdatePath = "\\serverbuild\dfsroot\ServerBuild\Windows\Automation\Scripts\DomainAddFixes.cmd"<br>LaunchLogPath = "c:\SrvCust\Logs\"<br>LaunchLogFile = "DomainAddFixes.log" |
| .bat | Launches a .bat (batch) file. Also can check for update if LaunchUpdatePath if specified. Arguments can be specified using LaunchArg.<br>Example:<br>[Run DomainAddFixes.bet]<br>LaunchName = "Domain Add Fixes"<br>LaunchFile = "DomainAddFixes.bat"<br>LaunchPath = "C:\SrvCust\Tools\"<br>LaunchUpdatePath = "\\serverbuild\dfsroot\ServerBuild\Windows\Automation\Scripts\DomainAddFixes.bat"<br>LaunchLogPath = "c:\SrvCust\Logs\"<br>LaunchLogFile = "DomainAddFixes.log" |
| .msi | Launches an .msi installation file from a central location.<br>Example:<br>[Install MBSA 1.2]<br>LaunchName = "MBSA-v1.2"<br>LaunchFile = "MBSASetup-en.msi"<br>LaunchPath = "\\ServerBuild.energyco.com\dfsroot\ServerBuild\Windows\InstallFiles\Software\BaselineAnalyzer\"<br>LaunchLogPath = "c:\SrvCust\Logs\"<br>LaunchLogFile = "MBSA-12-Setup.log" |
| .rga | Adds a registry setting as specified by LaunchPath.<br>Example:<br>[Windows Explorer Windows Classic Folders HKCU]<br>LaunchName = "Registry Value Add (Windows Classic Folders)"<br>LaunchFile = "Registry.Rga"<br>LaunchPath = "HKCU\Software\Microsoft\Windows\CurrentVersion\Explorer\Advanced\WebView=0d"<br>LaunchLogPath = "c:\SrvCust\Logs\"<br>LaunchLogFile = "Registry.log" |

TABLE 5-continued

Launch File Extensions

| | | |
|---|---|---|
| .rgd | Removes (deletes) a registry setting as specified by LaunchPath. Example: [Remove GRC Run Key] | |
| | LaunchName | = "Remove CopyGRC from Reg Run" |
| | LaunchFile | = "RemoveCopyGRC.rgd" |
| | LaunchPath | = "HKLM\SOFTWARE\Microsoft\Windows\CurrentVersion\Run\CopyGRC=*" |
| | LaunchLogPath | = "c:\SrvCust\Logs\" |
| | LaunchLogFile | = "SAV.log" |
| .upd | Updates the files specified by LaunchPath from LaunchUpdatePath. Example: [Sync Default User Profile] | |
| | LaunchName | = "Default Profile" |
| | LaunchFile | = "Update.upd" |
| | LaunchUpdatePath | = "\\ServerBuild.southernco.com\dfsroot\ServerBuild\Windows\Automation\Customizer\Build\NTUSER.DAT" |
| | LaunchPath | = "C:\Documents and Settings\Default User\NTUSER.DAT" |
| | LaunchLogPath | = "C:\SrvCust\Logs\" |
| | LaunchLogFile | = "SrvCust.log" |
| rbp | Reboots the machine with a user prompt. Example: "Reboot.rbp" Example: [Reboot When Done] | |
| | LaunchName | = "Reboot upon Completion." |
| | *.rbp- reboot with prompt. *.rbt - reboot without prompt | |
| | LaunchFile | = "Reboot.rbp" |
| | LaunchLogPath | = "c:\SrvCust\Logs\" |
| | LaunchLogFile | = "Reboot.log" |
| .rbt | Reboots the machine without prompting. Example: "Reboot.rbt" Example: [Reboot When Done] | |
| | LaunchName | = "Reboot upon Completion." |
| | *.rbp- reboot with prompt. *.rbt - reboot without prompt | |
| | LaunchFile | = "Reboot.rbt" |
| | LaunchLogPath | = "c:\SrvCust\Logs\" |
| | LaunchLogFile | = "Reboot.log" |
| .sto | Stops the service specified in LaunchPath. Example: "Service.sto" Example: [Stop NetIQmc Service] | |
| | LaunchName | = "Stopping NetIQmc" |
| | LaunchFile | = "Service.sto" |
| | LaunchPath | = "NetIQmc" |
| | LaunchLogPath | = "C:\SrvCust\Logs\" |
| | LaunchLogFile | = "DCPromo.log" |
| .sta | Starts the service specified in LaunchPath. Example: "Service.sta" Example: [Start Volume Shadow Copy service] | |
| | LaunchName | = "Starting Volume Shadow Copy service" |
| | LaunchFile | = "Service.sta" |
| | LaunchPath | = "VSS" |
| | LaunchLogPath | = "C:\SrvCust\Logs\" |
| | LaunchLogFile | = "FSVolumeShadowCopy.log" |
| .rst | Restarts the service specified in LaunchPath. Example: "Service.rst" Example: [Restart Symantec antivirus client Service] | |
| | LaunchName | = "Stopping Symantec AntiVirus Client" |
| | LaunchFile | = "Service.rst" |
| | LaunchPath | = "Symantec AntiVirus" |
| | LaunchLogPath | = "C:\SrvCust\Logs\" |
| | LaunchLogFile | = "SAV9.log" |
| .sha | Adds a share using LaunchPath as the Path and LaunchArg as the ShareName. Example: [Create Share Temp] | |
| | LaunchName | = "Create Share Temp" |
| | LaunchFile | = "share.sha" |
| | LaunchPath | = "e:\temp" |
| | LaunchArg | = "Temp$" |
| | LaunchLogPath | = "c:\SrvCust\Logs\" |
| | LaunchLogFile | = "CreateShare.log" |
| .shd | Deletes a share using LaunchArg as the ShareName. Example: [Delete Share Temp] | |
| | LaunchName | = "Delete Share Temp" |
| | LaunchFile | = "share.shd" |
| | LaunchPath | = "e:\temp" |
| | LaunchArg | = "Temp$" |
| | LaunchLogPath | = "c:\SrvCust\Logs\" |
| | LaunchLogFile | = "DeleteShare.log" |
| .wri | Writes the line specified in LaunchArg to the file specified in LaunchPath. Example: [Write to dcpromo.txt Key Name] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "[DCInstall]" |
| | LaunchLogPath | = "c:\SrvCust\Logs\" |
| | LaunchLogFile | = "DCPromo.log" |
| | [Write to dcpromo.txt UserName] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "UserName=@ID@" |
| | LaunchLogPath | = "c:\SrvCust\Logs\" |
| | LaunchLogFile | = "DCPromo.log" |
| | [Write to dcpromo.txt Password] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "Password=@PW@" |
| | LaunchLogPath | = "c:\SrvCust\Logs\" |
| | LaunchLogFile | = "DCPromo.log" |
| | [Write to dcpromo.txt UserDomain] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "UserDomain=@UserDomain@" |
| | LaunchLogPath | = "c:\SrvCust\Logs\" |
| | LaunchLogFile | = "DCPromo.log" |
| | [Write to dcpromo.txt line #4] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "AutoConfigDNS=No" |
| | LaunchLogPath | = "c:\SrvCust\Logs\" |
| | LaunchLogFile | = "DCPromo.log" |
| | [Write to dcpromo.txt line #5] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "CriticalReplicationOnly=No" |
| | LaunchLogPath | = "c:\SrvCust\Logs\" |
| | LaunchLogFile | = "DCPromo.log" |
| | [Write to dcpromo.txt line #6] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "ReplicaDomainDNSName=@Domain@" |
| | LaunchLogPath | = "c:\SrvCust\Logs\" |
| | LaunchLogFile | = "DCPromo.log" |
| | [Write to dcpromo.txt line #7] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "ReplicationSourceDC=@DCServer@" |
| | LaunchLogPath | = "c:\SrvCust\Logs\" |
| | LaunchLogFile | = "DCPromo.log" |
| | [Write to dcpromo.txt line #8] | |
| | LaunchName | = "Writing to dcpromo.txt" |
| | LaunchFile | = "Write.wri" |
| | LaunchPath | = "C:\SrvCust\dcpromo.txt" |
| | LaunchArg | = "SafeModeAdminPassword=@ComputerName@@Complex@" |
| | LaunchLogPath | = "c:\SrvCust\Logs\" |
| | LaunchLogFile | = "DCPromo.log" |
| .del | Deletes the file specified in LaunchPath. Example: [Delete dcpromo.txt final] | |
| | LaunchName | = "Deleting DCPromo.txt" |
| | LaunchFile | = "File.del" |
| | LaunchPath | = "C:\SrvCust\dcpromo.txt" |
| | LaunchLogPath | = "c:\SrvCust\Logs\" |
| | LaunchLogFile | = "DCPromo.log" |

TABLE 5-continued

Launch File Extensions

.end    Conditional end.
Usages:
IsDomainController.end - If the machine is a DC it will stop execution.
NotDomainController.end - If it is not a DC it will stop execution.
IISInstalled.end - If IIS is installed, it will stop execution
IsIPAddress.end - If LaunchArg IPAddress is the machines IP address then end execution.
NotTerminalServer.end - If machine is not a Terminal Server, end.
ServiceInstalled.end - If the service named in LaunchArg is installed, end.
Example:
[If DC Stop]
```
LaunchName     = "Checking to see if DC"
LaunchFile     = "IsDomainController.end"
LaunchLogPath  = "c:\SrvCust\Logs\"
LaunchLogFile  = "DCPromo.log"
```
[If IIS Stop]
```
LaunchName     = "Checking to see if IIS is installed"
LaunchFile     = "IISInstalled.end"
LaunchLogPath  = "c:\SrvCust\Logs\"
LaunchLogFile  = "DCPromo.log"
```
[If NSA Stop]
```
LaunchName     = "Checking to see if Server is NSA"
LaunchFile     = "isIPAddress.end"
LaunchArg      = "145.125.65.35"
LaunchLogPath  = "c:\SrvCust\Logs\"
LaunchLogFile  = "InstallDNS.log"
```
[If Not Terminal Server Stop]
```
LaunchName     = "Checking to see if WTS"
LaunchFile     = "NotTerminalServer.end"
LaunchLogPath  = "c:\SrvCust\Logs\"
LaunchLogFile  = "WTSHomeRun.log"
```
[If SAV Stop]
```
LaunchName     = "Checking to see if SAV is installed"
LaunchFile     = "ServiceInstalled.end"
LaunchArg      = "Symantec AntiVirus"
LaunchLogPath  = "c:\SrvCust\Logs\"
LaunchLogFile  = "SAV9.log"
```

.skp    Conditional skip.
Usage:
Condition.skp - Condition statement in LaunchArg is true, execution performs the following key command set. Otherwise it will skip it. LaunchArg can have a variety of possible comparisons as pointed out in the examples below. If the comparisons are false or prompt is selected as no, the following key command set is skipped.
Example:
In the example below, the substitution, "@ComputerName@ is compared to the first two characters of the actual computer name. The number of characters to compare is contained in the parentheses.
[Skip NSB if Not MS]
*Skips the NSB setting below if machine name does not begin with "MS".
```
LaunchName     = "Skip NSB if not AL"
LaunchFile     = ServerName.skp
LaunchArg      = @ComputerName@=MS(2)
LaunchLogPath  = "c:\SrvCust\Logs\"
LaunchLogFile  = "InstallDNS.log"
```
[Skip Not EnergyCo]
```
LaunchName     = "Skip Password Filter if not EnergyCo"
LaunchFile     = Conditional.skp
LaunchArg      = @Domain@=Energyco.com
LaunchLogPath  = "c:\SrvCust\Logs\"
LaunchLogFile  = "DCCustomizations.log"
```
[Validate Add energyco\ACL-SC-OIS-ADM to Administrators]
```
LaunchName     = "Validating Group Add"
LaunchFile     = Validate.skp
LaunchArg      = "Prompt=Add OIS Admins to local Administrators group?"
launchLogFile  = "DomainAddFixes.log"
```

.idr    Removes the ID supplied under LaunchPath from the local machine.
Example:
[Remove SUPPORT_account]
```
LaunchName     = "Remove Support Account"
LaunchFile     = "RemoveID.IDR"
LaunchPath     = "SUPPORT_388945a0"
LaunchLogPath  = "c:\SrvCust\Logs\"
LaunchLogFile  = "RemoveID.log"
```

.ida    Adds the ID to the LocalGroup, both supplied in LaunchPath as "LocalGroupName,Domain/User(or Group)" on the local machine.
Example:
[Add energyco\ACL-SC-OIS-ADM to Administrators]
```
LaunchName     = "Adding energyco\ACL-SC-OIS-ADM to Administrators"
LaunchFile     = "AddID.IDA"
LaunchPath     = "Administrators,energyco\ACT-SG-OIF-ADM"
LaunchLogPath  = "c:\SrvCust\Logs\"
LaunchLogFile  = "DomainAddFixes.log"
```

As an example of an initialization file for the SrvMUI utility, the "Build" section of the server customizer that created the button named "Domain Add Fix" launches the following file:

```
*DomainAddFix.ini
[Version]
Version=1.0
***** Domain Add Fix *****
[If DC Stop]
LaunchName="Checking to see if DC"
LaunchFile="IsDomainController.end"
LaunchLogPath="c:\SrvCust\Logs\"
LaunchLogFile="DomainAddFixes.log"
[Run DomainAddFixes.cmd]
LaunchName="Domain Add Fixes"
LaunchFile="DomainAddFixes.cmd"
LaunchPath="C:\SrvCust\Tools\"
LaunchUpdatePath="\\serverbuild\dfsroot\ServerBuild\
   Windows\Automation\Scripts\DomainAddFixes.cmd"
LaunchLogPath="c:\SrvCust\Logs\"
LaunchLogFile="DomainAddFixes.log"
[Add energyco\ADM-BackupOperators to Backup Operators]
LaunchName="Adding energyco\ADM-BackupOperators to Backup Operators"
LaunchFile="AddID.IDA"
LaunchPath="Backup Operators,southernco\ADM-BackupOperators"
LaunchLogPath="c:\SrvCust\Logs\"
LaunchLogFile="DomainAddFixes.log"
[Add energyco\ADM-ServerOperators to Power Users]
LaunchName="Adding energyco\ADM-ServerOperators to Power Users"
LaunchFile="AddID.IDA"
LaunchPath="Power Users,energyco\ADM-ServerOperators"
LaunchLogPath="c:\SrvCust\Logs\"
LaunchLogFile="DomainAddFixes.log"
[Validate Add energyco\ADM-WebInfrastruct to Administrators]
LaunchName="Validating Group Add"
LaunchFile=Validate.skp
LaunchArg="Prompt=Add Web Infrastructure to local Administrators group?"
LaunchLogFile="DomainAddFixes.log"
[Add energyco\ADM-WebInfrastruct to Administrators]
LaunchName="Adding energyco\ADM-WebInfrastruct to Administrators"
LaunchFile="AddID.IDA"
LaunchPath="Administrators,Energyco\ADM-WebInfrastruct"
LaunchLogPath="c:\SrvCust\Logs\"
LaunchLogFile="DomainAddFixes.log"
```

[Validate Add energyco\ADM-ExchSiteAdmins to Administrators]
LaunchName="Validating Group Add"
LaunchFile=Validate.skp
LaunchArg="Prompt=Add Exchange Operators to local Administrators group?"
LaunchLogFile="DomainAddFixes.log"
[Add energyco\ADM-ExchSiteAdmins to Administrators]
LaunchName="Adding energyco\ADM-ExchSiteAdmins to Administrators"
LaunchFile="AddID.IDA
LaunchPath="Administrators,energyco\ADM-ExchSiteAdmins"
LaunchLogPath="c:\SrvCust\Logs\"
LaunchLogFile="DomainAddFixes.log"
[Validate Add energyco\ADM-DBAAdmins to Administrators]
LaunchName="Validating Group Add"
LaunchFile=Validate.skp
LaunchArg="Prompt=Add Oracle/SQL DBAs to local Administrators group?"
LaunchLogFile="DomainAddFixes.log"
[Add energyco\ADM-DBAAdmins to Administrators]
LaunchName="Adding energyco\ADM-DBAAdmins to Administrators"
LaunchFile="AddID.IDA
LaunchPath="Administrators,energyco\ADM-DBAAdmins"
LaunchLogPath="c:\SrvCust\Logs\"
LaunchLogFile="DomainAddFixes.log"
[Validate Add energyco\ACL-SC-OIS-ADM to Administrators]
LaunchName="Validating Group Add"
LaunchFile=Validate.skp
LaunchArg="Prompt=Add OIS Admins to local Administrators group?"
LaunchLogFile="DomainAddFixes.log"
[Add energyco\ACL-SC-OIS-ADM to Administrators]
LaunchName="Adding energynco\ACL-SC-OIS-ADM to Administrators"
LaunchFile="AddID.IDA
LaunchPath="Administrators,energyco\ACL-SC-OIS-ADM"
LaunchLogPath="c:\SrvCust\Logs\"
LaunchLogFile="DomainAddFixes.log"
[Add energyco\ProductCertificationDelivery if in BatUsers]
LaunchName="Validating Group Add"
LaunchFile=NotBatUsers.skp
LaunchArg="@Domain@=BatUsers"
LaunchLogFile="DomainAddFixes.log"
[Add energyco\ProductCertificationDelivery to Administrators]
LaunchName="Adding energyco\ProductCertificationDelivery to Administrators"
LaunchFile="AddID.IDA
LaunchPath="Administrators, energyco\ProductCertificationDelivery"
LaunchLogPath="c:\SrvCust\Logs\"
LaunchLogFile="DomainAddFixes.log"
[SetVersion]
Version=1.0
[AppSettings]
NetPath="\\ServerBuild\dfsroot\ServerBuild\Windows\Automation"
LocalPath="C:\SrvCust"
CustPath="\\ServerBuild\dfsroot\ServerBuild\Windows\Automation\ Customizer"
FormText="Domain Add Fixes"

As another example of an initialization file for the SrvMUI utility, the "Build" section of the server customizer that created the button named "Symantec Antivirus" launches the SAV.ini initialization file below. The GRC.dat file is a text file containing configuration information for the "clients" of a Symantec Antivirus server. The selected machines receive policy settings from the Symantec Antivirus server through the Grc.dat file. The file writes certain settings to a machine's registry.

*SAV.ini
[Prompt]
LaunchArg="Are you sure you want to install Symantec AntiVirus on this machine?"
[Version]
Version=v9.0.1.1000
[Select]
Select1=Clusters
Select2=Database Server
Select3=File& Print
Select4=Print Servers
Select5=App Server
Select6=SMS Servers
[Expand PTW]
LaunchName="Expanding Package"
LaunchFile="SymantecAntiVirus9.0.1.1000.exe"
LaunchArg=–e " "
LaunchPath="@Temp@"
LaunchUpdatePath="\\energyco.com\dfsroot\Software\WksImage\SymantecAntiVirus\SymantecAntiVirus9.0.1.1000.exe"
LaunchLogPath="c:\SrvCust\Logs\"
LaunchLogFile="SAV.log"
[Install SAV]
LaunchName="Installing SAV"
LaunchFile="Setup.exe"
LaunchArg="/hrlog=@Temp@\say.log"
LaunchPath="@WinDir@\Downloaded Installations\Symantec AntiVirus\"
LaunchLogPath="c:\SrvCust\Logs\"
LaunchLogFile="SAV.log"
[Remove GRC Run Key]
LaunchName="Remove CopyGRC from Reg Run"
LaunchFile="RemoveCopyGRC.rgd"
LaunchPath="HKLM\SOFTWARE\Microsoft\Windows\CurrentVersion\Run\CopyGRC=*"
LaunchLogPath="c:\SrvCust\Logs\"
LaunchLogFile="SAV.log"
[Update GRC.dat]
LaunchName="Dropping GRC.dat"
LaunchFile="Update.upd"
;LaunchUpdatePath="\\serverbuild\dfsroot\ServerBuild\Windows\InstallFiles\Software\NAV\v8.11_b323\Groups\@Select@\GRC.DAT"
LaunchUpdatePath="\\gaxgpap61\c$\Program Files\SAV\Groups\@Select@\GRC.DAT"
LaunchPath="C:\Documents and Settings\All Users\ApplicationData\Symantec\Symantec AntiVirus Corporate Edition\7.5\grc.dat"
LaunchLogPath="C:\SrvCust\Logs\"
LaunchLogFile="SAV.log"
[Restart Symantec antivirus client Service]
LaunchName="Stopping Symantec AntiVirus Client"
LaunchFile="Service.rst"

```
LaunchPath=Symantec AntiVirus
LaunchLogPath="C:\SrvCust\Logs\"
LaunchLogFile="SAV.log"
[Delete Symantec Install file]
LaunchName="Deleting SAV Install file"
LaunchFile="File.del"
LaunchPath="@Temp@\SymantecAntiVirus9.0.1.
    1000.exe"
LaunchLogPath="c:\SrvCust\Logs\"
LaunchLogFile="SAV.log"
[SetVersion]
Version=v9.0.1.1000
*Reboot from Cust.ini
[AppSettings]
NetPath="\\ServerBuild\dfsroot\ServerBuild\Windows\
    Automation"
LocalPath="C:\SrvCust"
CustPath="\\ServerBuild\dfsroot\ServerBuild\Windows\
    Automation\Customizer"
FormText="Install Symantec Antivirus"
```

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method, comprising:
    installing a server customizer module on at least one server, the server customizer module comprising a server customizer initialization file;
    receiving a plurality of initialization file inputs;
    installing a server unattended install launch module on at least one server, the server unattended install launch module comprising an unattended install launch initialization file to launch a plurality of standardized processes on the at least one server, wherein the unattended install launch initialization file is generated from the plurality of initialization file inputs;
    setting a version of said server customizer initialization file;
    chaining said plurality of standardized processes based on the version of said server customizer initialization file of said server customizer module; and
    executing the server customizer module and the server unattended install launch module on the at least one server;
    wherein the server customizer module further comprises a domain list and a plurality of application settings;
    wherein the plurality of application settings comprises identification of a central network location storing a most current version of the server customizer module and initialization files, and
    wherein the server customizer module and server customer initialization file are automatically updated from a corresponding centrally stored version.

2. The method of claim 1, wherein the execution of the server unattended install launch module is launched from the server customizer module.

3. The method of claim 1, wherein the execution of the server unattended install launch module is performed independently of the server customizer module.

4. The method of claim 1, wherein the server customizer initialization file comprises at least one of:
    a plurality of arguments to populate and run a plurality of standardized applications, scripts, and utilities on the at least one server; and
    a functional section and an application settings section.

5. The method of claim 4, wherein the functional section comprises at least one of a build section, a customize section, an install section, and a utilities section.

6. The method of claim 1, wherein the server customizer module further comprises a user interface.

7. The method of claim 6, wherein the user interface for the server customizer module comprises a plurality of tabs that are created by the server initialization file.

8. The method of claim 7, wherein each tab comprises a plurality of selectable functions, with each selectable function comprising a set of keys that provide a value for a name, a location, a plurality of arguments, and a log file associated with the selectable function.

9. The method of claim 8, wherein the set of keys further provides a value for an update path associated with the selectable function.

10. The method of claim 8, wherein the set of keys further comprises a key that instructs the server customizer module on an action to take upon completion of a launched process.

11. The method of claim 10, wherein the action to take is selected from a group comprising a reboot of the server, a prompt to reboot the server, a prompt to rename the server, a prompt to join a domain, and a deletion of a specified file.

12. The method of claim 1, wherein the domain list comprises each domain that is managed by the server customizer module.

13. The method of claim 1, wherein the server unattended install launch module comprises a functional section comprising a plurality of functions, each function representing a specific process, and an application settings section.

14. The method of claim 13, wherein the plurality of processes launched by the server unattended launch module on the at least one server comprise at least one of a registry configuration, a keyword substitution, a file execution, an executable file installation, a local file update with a centrally maintained file, a server reboot, a customization service start, stop and restart, a share file creation, a share file deletion, and an addition or removal of a local identifier or group from the server.

15. A non-transitory computer readable hardware medium comprising computer program instructions that, when executed by at least one processor, are configured to cause the at least one processor to:
    install a server customizer module on at least one server, the server customizer module comprising a server customizer initialization file;

receive a plurality of initialization file inputs;
install a server unattended install launch module on the at least one server, the server unattended install launch module comprising an unattended install launch initialization file to launch a plurality of standardized processes on the at least one server, wherein the unattended install launch initialization file is generated from the plurality of initialization file inputs;
set a version of said server customizer initialization file;
chain said plurality of standardized processes based on the version of said server customizer initialization file of said server customizer module; and
execute the server customizer module and the server unattended install launch module on the at least one server;
wherein the server customizer module further comprises a domain list and a plurality of application settings;
wherein the plurality of application settings comprises identification of a central network location storing a most current version of the server customizer module and initialization files, and
wherein the server customizer module and server customer initialization file are automatically updated from a corresponding centrally stored version.

16. The non-transitory computer readable hardware medium of claim 15, wherein the computer program instructions are further configured to cause the at least one processor to launch the server unattended install launch module from the server customizer module.

17. The non-transitory computer readable hardware medium of claim 15, wherein the computer program instructions are further configured to cause the at least one processor to generate a functional section and an application settings section.

18. The non-transitory computer readable hardware medium of claim 17, wherein the functional section comprises at least one of a build section, a customize section, an install section and a utilities section.

19. The non-transitory computer readable hardware medium of claim 15, wherein the computer program instructions are further configured to cause the least one processor to generate a user interface for the server customizer module.

20. The non-transitory computer readable hardware medium of claim 19, wherein the user interface comprises a plurality of tabs on the user interface.

21. The non-transitory computer readable hardware medium of claim 20, wherein each tab comprises a plurality of selectable functions, with each selectable function comprising a set of keys that provide a value for a name, a location, a plurality of arguments, and a log file associated with the selectable function.

22. The non-transitory computer readable hardware medium of claim 21, wherein the set of keys further provides a value for an update path associated with the selectable function.

23. The non-transitory computer readable hardware medium of claim 21, wherein the set of keys further comprises a key that instructs the server customizer module on an action to take upon completion of a launched process.

24. The non-transitory computer readable hardware medium of claim 23, wherein the action to take is selected from a group comprising a reboot of the server, a prompt to reboot the server, a prompt to rename the server, a prompt to join a domain, and a deletion of a specified file.

25. The non-transitory computer readable hardware medium of claim 15, wherein the domain list comprises each domain that is managed by the server customizer module.

26. The non-transitory computer readable hardware medium of claim 15, wherein the server unattended install launch module comprises a functional section comprising a plurality of functions, each function representing a specific process, and an application settings section.

27. The non-transitory computer readable hardware medium of claim 26, wherein the server unattended launch module on the at least one server comprises at least one of a registry configuration, a keyword substitution, a file execution, an executable file installation, a local file update with a centrally maintained file, a server reboot, a customization service start, stop and restart, a share file creation, a share file deletion, and an addition or removal of a local identifier or group from the server.

28. A system, comprising:
a server unattended install launch module comprising an unattended install launch initialization file to launch a plurality of standardized processes executed by at least one processor on a server, the unattended install launch initialization file generated from a plurality of initialization file inputs; and
a server customizer module, cooperative with the server unattended install launch module, comprising a server customizer initialization file comprising a plurality of arguments and a version of the server customizer initialization file of said server customizer module to populate, chain and run a plurality of standardized applications, scripts, and utilities on the server;
wherein the server customizer module further comprises a domain list and a plurality of application settings;
wherein the plurality of application settings comprises identification of a central network location storing a most current version of the server customizer module and initialization files, and
wherein the server customizer module and server customer initialization file are automatically updated from a corresponding centrally stored version.

29. The system of claim 28, wherein the server customizer initialization file comprises a functional section and an application setting section.

30. The system of claim 29, wherein the functional section of the server customizer initialization file comprises at least one of a build section, a customize section, an install section, and a utilities section.

31. The system of claim 28, wherein each selectable function comprises a set of keys that provide a value for a name, a location, a plurality of arguments, and a log file associated with the selectable function.

32. The system of claim 31, wherein the set of keys further provides a value for an update path associated with the selectable function.

33. The system of claim 31, wherein the set of keys further comprises a key that instructs the server customizer module on an action to take upon completion of a launched process.

34. The system of claim 33, wherein an action to take is selected from a group comprising a reboot of the server, a prompt to reboot the server, a prompt to rename the server, a prompt to join a domain, and a deletion of a specified file.

35. The system of claim 28, wherein the domain list comprises each domain that is managed by the server customizer module.

36. The system of claim 28, wherein the server unattended install launch module comprises a functional section comprising a plurality of functions, each function representing a specific process, and an application settings section.

37. The system of claim 28, wherein the plurality of processes launched by the server unattended launch module on each server comprises at least one of a registry configuration, a keyword substitution, a file execution, an executable file installation, a local file update with a centrally maintained file, a server reboot, a customization service start, stop and restart, a share file creation, a share file deletion, and an addition or removal of a local identifier or group from the server.

* * * * *